(No Model.)
G. D. HAWORTH.
CORN PLANTER CHECK LINE REEL.
No. 277,030. Patented May 8, 1883.
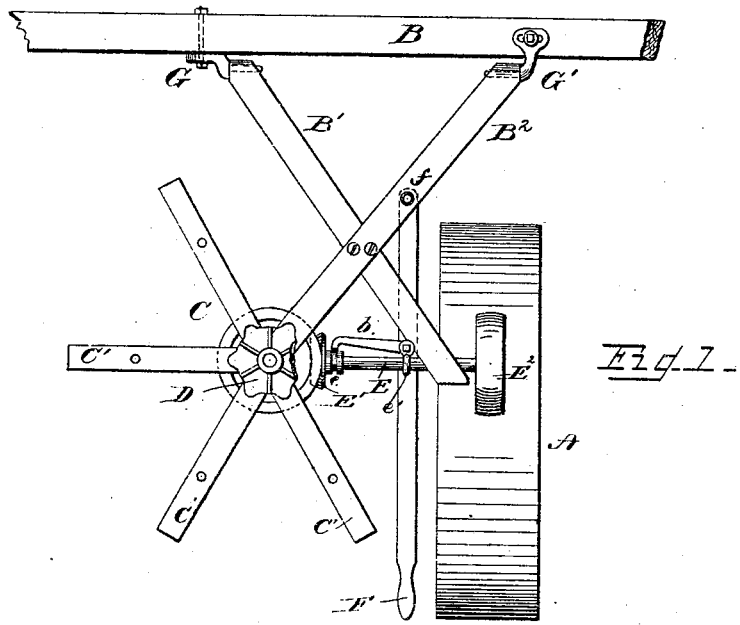
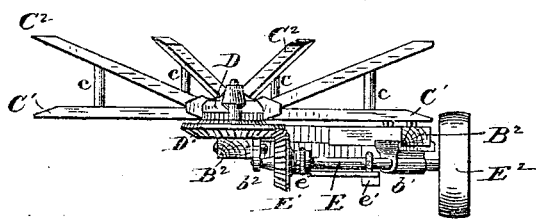
Witnesses.
F. L. Durand.
Rex. Smith.
Inventor,
George D. Haworth.
by A. M. Smith,
Attorney.

UNITED STATES PATENT OFFICE.

GEORGE D. HAWORTH, OF DECATUR, ILLINOIS.

CORN-PLANTER CHECK-LINE REEL.

SPECIFICATION forming part of Letters Patent No. 277,030, dated May 8, 1883.

Application filed January 6, 1883. (No model.)

*To all whom it may concern:*

Be it known that I, GEORGE D. HAWORTH, of Decatur, county of Macon, and State of Illinois, have invented a new and useful Improvement in Corn-Planter Check-Line Reels, of which the following is a full, clear, and exact description, reference being had to the accompanying drawings, making part of this specification.

My invention relates to means for facilitating the reeling in of the check-line of a corn-planter from the ground; and it consists in the combination, with a reel mounted on the corn-planter for paying out and taking up the check-line, of mechanism controlled by the driver in his seat on the machine, whereby the reel is adapted to be actuated from one of the ground or carrying wheels of the corn-planter for taking up the check-line, and in certain details of construction whereby said invention may be carried out, hereinafter fully set forth.

In the accompanying drawings, Figure 1 is a top view, showing the application of the reel to one of the frame-bars and wheels of a corn-planter; and Fig. 2 is a rear elevation of the reel, showing the gearing and its actuating friction-wheel.

A represents one of the ground or carrying wheels of the corn-planter; B, one of the transverse frame-bars, and by preference the one to which the check-row attachment is secured, to which, by suitable pivotal pins, G and G', of any desired construction, is hinged the frame supporting the reel and its actuating mechanism. This frame is composed of two bars, B' and B², crossing each other, as shown, in the form of the letter X, and said bars are provided at their outer swinging ends with bearings b' and b² for the reception of a shaft, E. The shaft E is provided at its outer end, overhanging the carrying-wheel A, with a friction-wheel, E², resting in frictional contact with and adapted to be rotated by said carrying-wheel A when the planter is being drawn along. The inner opposite end of shaft E is also provided with a bevel-gear wheel, E', engaging with a similar gear-wheel, D', attached to the hub of reel C on the under side of said reel. The shaft of the bevel-gear wheel D' is also supported in bearings in the frame-bar B², and revolves therein, carrying with it the reel C.

This reel C is by preference constructed similarly to that described in Letters Patent No. 236,024, granted to me December 28, 1880—that is to say, composed of a central hub, D, having sockets in which are secured two sets of radial arms—a lower set, C' C', and an upper set, C² C², overlying the arms C' C', and diverging therefrom from the hub outward and upward, the upper and lower arms in the same vertical planes being united near their outer divergent ends by rods c c, which serve as the ribs of the reel, upon which the check-line is wound, the above construction forming a light and substantial reel for the purpose; but any suitable construction or form of reel may be employed in lieu thereof.

The bevel-gear wheel E' is provided on its outer side with a grooved collar, e, and is feathered to and slides upon the shaft E, in order that the said wheel E' may be withdrawn out of mesh with the gear-wheel D', and allow the reel C to remain at rest or pay out the check-line, as may be desired. This disengagement of the gear-wheels D' and E' is accomplished by means of a hand or foot lever, F, arranged within convenient reach of the driver in his seat on the machine, and pivoted at its forward end to one of the bars composing the supporting-frame of the reel and its actuating mechanism. This lever F has a small collar, e', surrounding the shaft B, to which collar is pivoted one end of a short arm, b, the other end being forked and engaging the groove in the collar e on the bevel-gear wheel E'. As previously stated, the gear-wheel E', together with its grooved collar e, is feathered to the shaft E, and it will be apparent that the vibration of the lever F outward or away from the center of the reel C will draw with it the short arm b, which will draw the bevel-gear wheel E' from its engagement with the gear-wheel D', and permit the reel C to remain at rest or unwind and pay out the check-line. I do not limit myself to this exact construction or arrangement above described. The shaft E may be extended beyond its bearing b², so as to overhang the ground or carrying wheel on the opposite side of the machine from the wheel A, and may be provided with a second friction-wheel engaging with said wheel, if desired; but the arrangement shown and described is the preferred one, and will be found to answer well for the purpose explained. Again, the bevel-gear wheel E' may be mounted loosely on the shaft E, and said shaft provided with a sliding collar feathered thereto, and secured to lever F, and having a clutch-face, adapting it to engage with a corresponding clutch-face on the collar of bevel-wheel E'. By vibrating the lever F said clutch-faces may be thrown into or out of engagement, the bevel-gearing in this construction always remaining in mesh, and being actuated by means of the engagement of the clutch-faces, as described.

Having now described my invention, what I claim as new is—

1. In a check-row corn-planter, a reel mounted upon a vertical axis for taking up the check-line from the ground and paying out the same, in combination with mechanism controlled by the driver in his seat on the machine, adapting said reel to be thrown into or out of engagement with and to be actuated by one of the ground or carrying wheels, substantially as described.

2. The combination, in a check-row corn-planter, of the check-line reel, the bevel-gears for actuating said reel, the friction-wheel, the ground or carrying wheel, and means controlled by the driver for throwing the gears into or out of mesh, substantially as specified.

3. In a corn-planter, the combination, with the ground or carrying wheel or wheels, of a friction wheel or wheels resting in frictional contact therewith, a reel for taking up and paying out the check-line, and means controlled by the driver for throwing said reel into or out of engagement with the friction-wheel and its actuated shaft, substantially as described.

4. The frame supporting the reel and its actuating mechanism, composed of the bars B' and B², crossing each other obliquely, and hinged at their forward ends to the corn-planter frame, substantially as described.

In testimony whereof I have hereunto set my hand this 2d day of January, A. D. 1883.

GEORGE D. HAWORTH.

Witnesses:
C. O. JUDSON,
THEO. COLEMAN.